(12) United States Patent
Mori (10) Patent No.: US 11,618,241 B2
(45) Date of Patent: Apr. 4, 2023

(54) GLASS ROLL

(71) Applicant: Nippon Electric Glass Co., Ltd., Shiga (JP)

(72) Inventor: Hiroki Mori, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 17/782,743

(22) PCT Filed: Nov. 11, 2020

(86) PCT No.: PCT/JP2020/042033
§ 371 (c)(1),
(2) Date: Jun. 6, 2022

(87) PCT Pub. No.: WO2021/117405
PCT Pub. Date: Jun. 17, 2021

(65) Prior Publication Data
US 2023/0001668 A1    Jan. 5, 2023

(30) Foreign Application Priority Data
Dec. 9, 2019 (JP) .............................. JP2019-222280

(51) Int. Cl.
*B32B 3/10* (2006.01)
*B32B 7/12* (2006.01)
*B32B 17/10* (2006.01)

(52) U.S. Cl.
CPC .......... *B32B 7/12* (2013.01); *B32B 17/10018* (2013.01); *B32B 17/10293* (2013.01); *B32B 2307/546* (2013.01); *B32B 2307/732* (2013.01)

(58) Field of Classification Search
None
See application file for complete search history.

(56) References Cited

U.S. PATENT DOCUMENTS 8,304,058 B2  11/2012  Nakamura et al.
2010/0260964 A1  10/2010  Nakamura et al.
(Continued)

FOREIGN PATENT DOCUMENTS

JP    2001-97733    4/2001
JP    2001-113631   4/2001
(Continued)

OTHER PUBLICATIONS

International Search Report dated Feb. 9, 2021 in corresponding International Application No. PCT/JP2020/042033.
(Continued)

*Primary Examiner* — Christopher M Polley
(74) *Attorney, Agent, or Firm* — Wenderoth, Lind & Ponack, L.L.P.

(57) ABSTRACT

A glass roll (1) includes a laminate film (5) taken up into a roll shape, the laminate film including a glass film (2), a protective film (3), and an adhesive layer (4), which is arranged between the glass film (2) and the protective film (3), and is configured to bond the glass film (2) to the protective film (3). A width (A) of the protective film (3) is larger than a width (B) of the glass film (2), and both end portions (3x) of the protective film (3) in a width direction each protrude with respect to the glass film (2). The width (B) of the glass film (2) is larger than a width (C) of the adhesive layer (4), and both end portions (2x) of the glass film (2) in the width direction each protrude with respect to the adhesive layer (4).

16 Claims, 3 Drawing Sheets

(56) References Cited

U.S. PATENT DOCUMENTS

| | | | | |
|---|---|---|---|---|
| 2011/0177347 A1* | 7/2011 | Tomamoto | ........... | B65D 85/672 |
| | | | | 428/426 |
| 2016/0311722 A1* | 10/2016 | Ortner | ................... | C03C 17/322 |
| 2017/0240368 A1* | 8/2017 | Roβmeier | ............... | C03C 3/083 |

FOREIGN PATENT DOCUMENTS

| | | |
|---|---|---|
| JP | 2010-228166 | 10/2010 |
| JP | 2013-22903 | 2/2013 |
| JP | 2013-79181 | 5/2013 |
| JP | 2014-32222 | 2/2014 |
| JP | 2017-43366 | 3/2017 |
| JP | 2018-187797 | 11/2018 |

OTHER PUBLICATIONS

International Preliminary Report on Patentability and Written Opinion of the International Searching Authority dated May 17, 2022 in corresponding International Application No. PCT/JP2020/042033.

* cited by examiner

GLASS ROLL

TECHNICAL FIELD

The present invention relates to a glass roll including a glass film taken up into a roll shape.

BACKGROUND ART

As is well known, there are demands that thin display devices, such as a liquid crystal display and an OLED display, and further, mobile devices, such as a smartphone and a tablet PC, which have been rapidly spread in recent years, be lightweight. In this connection, a glass film formed into a film-like thin sheet shape has been increasingly used as a glass substrate to be employed for each of those devices. While the glass film forms a substantially rectangular shape or the like at the stage of a final product, the glass film is handled so as to form a strip shape at the stages of previous manufacturing steps or various treatment steps.

The glass film of this kind has appropriate flexibility, and is hence sometimes formed into a glass roll in which the glass film is taken up into a roll shape around a winding core or the like in consideration of convenience at the time of storage, transportation, or the like. Accordingly, when the glass film is formed into a glass roll, not only excellent storability and the like are achieved, but also a number of glass films each having a substantially rectangular shape or the like can be easily cut out.

Meanwhile, the glass film of this kind has low mechanical strength and is liable to be damaged or broken, and hence it requires careful attention to handle the glass film as it is. That is, when the glass film is taken up into a roll shape to produce a glass roll, the glass films having been taken up are brought into contact with each other, and damage such as a flaw may occur. In view of this, there is widely performed that the glass film is taken up into a roll shape under the state in which a strip-shaped protective film formed of a resin or the like is stacked thereon to produce a glass roll.

For example, in Patent Literature 1, there is a disclosure of a method of manufacturing a glass roll, including: bonding a glass film and a protective film including an adhesive layer (pressure-sensitive adhesive surface) to form a laminate film; and taking up the laminate film into a roll shape.

In Patent Literature 1, there is a disclosure that the width of the protective film is set to be smaller than the width of the glass film, or the width of the protective film is set to be equal to or larger than the width of the glass film. The adhesive layer is formed on the entire one surface of the protective film. That is, the adhesive layer has the same size as the protective film.

CITATION LIST

Patent Literature 1: JP 2018-187797 A

SUMMARY OF INVENTION

Technical Problem

When the width of the protective film is set to be smaller than the width of the glass film in the glass roll disclosed in Patent Literature 1, both end portions of the glass film in a width direction each protrude with respect to the protective film. In this case, the end portions of the glass film in the width direction cannot be protected with the protective film. As a result, for example, when the laminate film having been unwound from the glass roll is loaded into a conveyance facility such as a roll-to-roll device in order to subject the glass film to manufacture-related treatments, such as film formation, printing, and bonding with another member, there is a risk in that the end portions of the glass film in the width direction may be broken by being brought into contact with the conveyance facility (e.g., a guide roller or the like). Even when the width of the protective film is set to be equal to the width of the glass film, the end portions of the glass film in the width direction cannot be sufficiently protected with the protective film, and hence the problem of the breakage of the glass film may occur in the same manner.

Meanwhile, when the width of the protective film is set to be larger than the width of the glass film in the glass roll disclosed in Patent Literature 1, both end portions of the protective film in the width direction each protrude with respect to the glass film. In this case, the end portions of the glass film in the width direction can be protected with the protective film, and hence the breakage of the glass film can be suppressed. However, the adhesive layer has the same size as the protective film, and hence the adhesive layer is exposed on the surface of the protective film that protrudes with respect to the end portions of the glass film. As a result, when the laminate film having been unwound from the glass roll is loaded into a conveyance facility, there is a risk in that an adhesive (pressure-sensitive adhesive) forming the adhesive layer may adhere to the conveyance facility to contaminate the conveyance facility. Even when the width of the protective film is set to be equal to the width of the glass film, the end surfaces of the glass film, the protective film, and the adhesive layer in the width direction are positioned on the same plane, and hence the problem of the contamination of the conveyance facility due to adhesion of the adhesive forming the adhesive layer may occur in the same manner.

An object of the present invention is to provide a glass roll capable of suppressing contamination of a surrounding environment with an adhesive while suppressing breakage of a glass film.

Solution to Problem

According to one embodiment of the present invention, which has been devised in order to solve the above-mentioned problems, there is provided a glass roll, comprising a laminate film taken up into a roll shape, the laminate film comprising a glass film, a protective film, and an adhesive layer, which is arranged between the glass film and the protective film, and is configured to bond the glass film to the protective film, wherein a width of the protective film is larger than a width of the glass film, and both end portions of the protective film in a width direction each protrude with respect to the glass film, and wherein the width of the glass film is larger than a width of the adhesive layer, and both end portions of the glass film in the width direction each protrude with respect to the adhesive layer.

With this configuration, the width of the protective film is larger than the width of the glass film, and both the end portions of the protective film in the width direction each protrude with respect to the glass film, and hence both the end portions of the glass film in the width direction are reliably protected with the protective film. In addition, the width of the glass film, which is smaller than that of the protective film, is larger than the width of the adhesive layer, and both the end portions of the glass film in the width direction each protrude with respect to the adhesive layer, and hence the adhesive layer is completely hidden inside the respective end portions of the protective film and the glass film in the width direction. Accordingly, while the breakage of the glass film is suppressed with the protective film, the contamination of a surrounding environment due to adhesion of an adhesive forming the adhesive layer can be suppressed.

In the above-mentioned configuration, it is preferred that a protrusion width of each of the end portions of the glass film in the width direction with respect to the adhesive layer be from 0.1 mm to 10 mm.

With this configuration, while a sufficient bonding area for reliably bonding the glass film and the protective film is ensured, the contamination of a conveyance facility with the adhesive layer can be suppressed more reliably.

In the above-mentioned configuration, it is preferred that a protrusion width of each of the end portions of the protective film in the width direction with respect to the glass film be from 1 mm to 100 mm.

With this configuration, while the end portions of the glass film in the width direction are reliably protected with the protective film, a situation in which the protective film becomes excessively larger than the glass film and becomes wasteful can be prevented.

In the above-mentioned configuration, the adhesive layer may be a light pressure-sensitive adhesive layer formed on one surface of the protective film.

With this configuration, the glass film can be easily peeled off from the protective film as required.

In the above-mentioned configuration, it is preferred that the adhesive layer have a thickness of 100 µm or less.

With this configuration, the adhesive layer becomes sufficiently thin, and hence the contamination of a conveyance facility due to adhesion of an adhesive forming the adhesive layer can be suppressed more reliably.

Advantageous Effects of Invention

According to the present invention, while the breakage of the glass film is suppressed with the protective film, the contamination of a surrounding environment due to adhesion of an adhesive forming the adhesive layer can be suppressed.

DESCRIPTION OF EMBODIMENTS

Now, embodiments of the present invention are described with reference to the attached drawings.

First Embodiment

Figure 1:
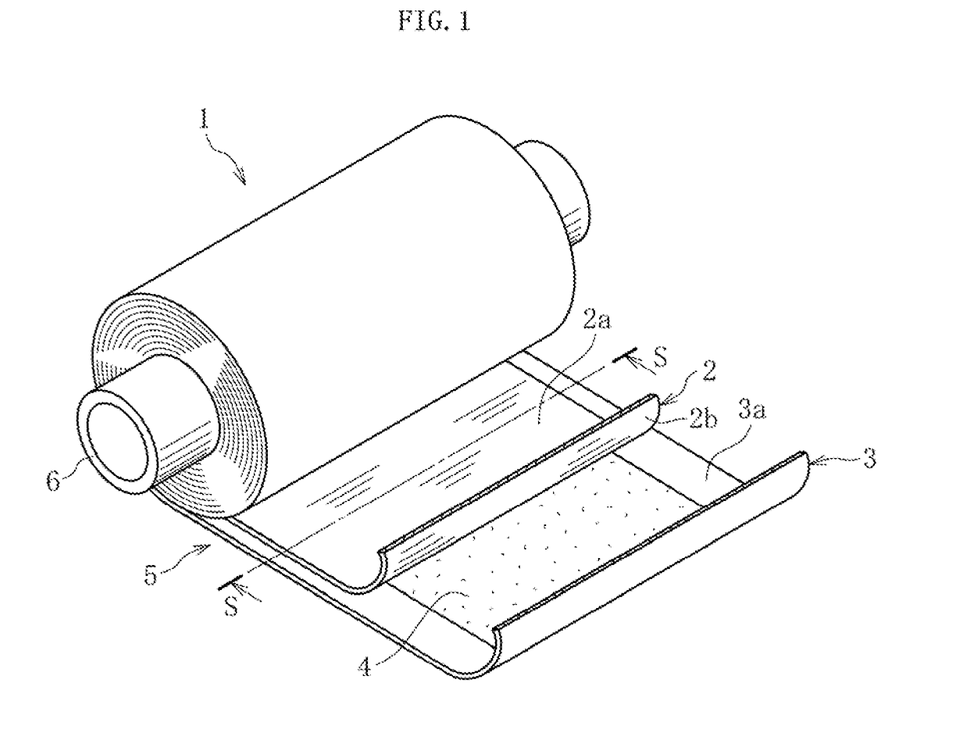
FIG. 1 is a perspective view for illustrating a glass roll according to a first embodiment.

As illustrated in FIG. 1, a glass roll 1 according to a first embodiment is a laminate film 5 taken up into a roll shape around a winding core 6, the laminate film comprising a strip-shaped glass film 2 and a strip-shaped protective film 3 stacked on each other via an adhesive layer 4.

The glass film 2 has a first surface 2a and a second surface 2b in a front and back relationship. In this embodiment, when the glass roll 1 is used in an electronic part application, the first surface 2a serves as a guaranteed surface, and the second surface 2b serves as a non-guaranteed surface. The guaranteed surface is a surface on a product side on which a device or the like is formed, and in which surface properties thereof are guaranteed, and the non-guaranteed surface is a surface in which surface properties thereof are not required to be guaranteed to the degree of those of the guaranteed surface. The glass roll 1 is configured so that the first surface 2a and the second surface 2b of the glass film 2 are inside and outside, respectively. When the glass roll 1 is used in an application in which surface accuracy is not particularly required, distinction between the guaranteed surface and the non-guaranteed surface is not required.

The thickness of the glass film 2 is preferably 300 µm or less, more preferably 10 µm or more and 200 µm or less, most preferably 30 µm or more and 100 µm or less.

As a material for the glass film 2, there are used silicate glass and silica glass, preferably borosilicate glass, soda lime glass, aluminosilicate glass, and chemical tempered glass, most preferably alkali-free glass. When the alkali-free glass is used as the glass film 2, chemically stable glass can be obtained. Herein, the alkali-free glass refers to glass substantially free of an alkali component (alkali metal oxide), specifically glass having a weight ratio of the alkali component of 3,000 ppm or less. In the present invention, the weight ratio of the alkali component is preferably 1,000 ppm or less, more preferably 500 ppm or less, most preferably 300 ppm or less.

The glass film 2 may be formed by a float method, a roll-out method, a slot down-draw method, a redraw method, and the like, which have hitherto been known, but is preferably formed by an overflow down-draw method.

The thickness of the protective film 3 is preferably 10 µm or more and 1,000 µm or less, more preferably 20 µm or more and 500 µm or less.

As a material for the protective film 3, there may be used, for example, organic resin films (synthetic resin films), such as an ionomer film, a polyethylene film, a polypropylene film, a polyvinyl chloride film, a polyvinylidene chloride film, a polyvinyl alcohol film, a polyester film, a polycarbonate film, a polystyrene film, a polyacrylonitrile film, an ethylene-vinyl acetate copolymer film, an ethylene-vinyl alcohol copolymer film, an ethylene-methacrylic acid copolymer film, a nylon (trademark) film (polyamide film), a polyimide film, and cellophane. Of those, a polyethylene terephthalate film (PET film) is preferably used.

Figure 2:
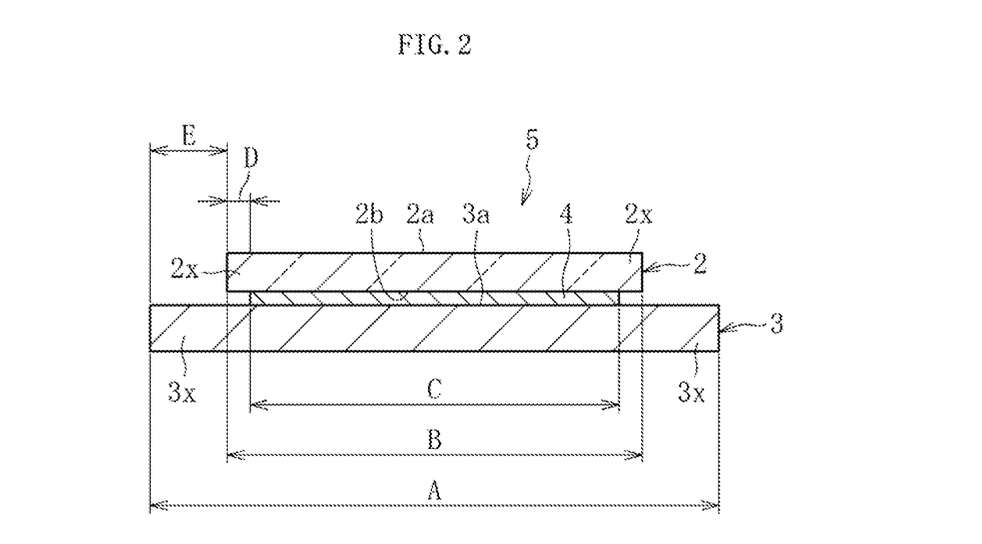
FIG. 2 is a sectional view taken along the line S-S of FIG. 1.

The adhesive layer 4 is formed on one surface 3a of the protective film 3, and is brought into contact with the second surface 2b of the glass film 2. That is, under the state of the laminate film 5, the second surface 2b of the glass film 2 is bonded to the one surface 3a of the protective film 3 via the adhesive layer 4.

The thickness of the adhesive layer 4 is preferably 100 pm or less, more preferably 50 µm or less, most preferably 10 µm or less.

The adhesive layer 4 may be a layer (light pressure-sensitive adhesive layer) having low adhesive strength to the extent that the glass film 2 can be peeled off, or may be a layer having high adhesive strength to the extent that the glass film 2 cannot be substantially peeled off. Herein, the adhesive layer 4 has a concept including a pressure-sensitive adhesive layer. As the light pressure-sensitive adhesive layer, a layer having a pressure-sensitive adhesive strength (peel strength) of, for example, 0.001 N/25 mm or more and 1.5 N/25 mm or less measured by a 180° peel strength test (in conformity with JIS Z 0237: 2009) may be used.

As a material for the adhesive layer 4, for example, a rubber-based adhesive, an acrylic adhesive, a silicone-based adhesive, a polyether- or polyurethane-based adhesive, or the like may be used. Of those, an acrylic adhesive, which causes less adhesive residue at the time of peeling, is suitable on the premise that the glass film 2 is peeled off. In addition, as the form of the adhesive layer 4, a solvent-type adhesive, a non-aqueous emulsion-type adhesive, an aqueous emulsion-type adhesive, a water-soluble adhesive, a solvent-free adhesive, a liquid curable adhesive, or the like may be used. When the adhesive layer 4 is the layer having high adhesive strength to the extent that the glass film 2 cannot be substantially peeled off, various thermoplastic resin adhesives or thermosetting resin adhesives may each be adopted.

The winding core 6 has a hollow cylindrical shape in this embodiment, but may have a solid cylindrical shape.

A material for the winding core 6 is not particularly limited, but there may be used, for example: a metal, such as an aluminum alloy, stainless steel, manganese steel, or carbon steel; a thermosetting resin, such as a phenol resin, a urea resin, a melamine resin, an unsaturated polyester resin, an epoxy resin, polyurethane, or a diallyl terephthalate resin; a thermoplastic resin, such as polyethylene, polypropylene, polystyrene, an AS resin, an ABS resin, a methacrylic resin, or vinyl chloride; a reinforced plastic obtained by mixing a reinforcing fiber, such as a glass fiber or a carbon fiber, with any of those thermosetting resins or thermoplastic resins; or a paper core.

As illustrated in FIG. 2, in the laminate film 5, a width A of the protective film 3 is larger than a width B of the glass film 2, and both end portions 3x of the protective film 3 in a width direction each protrude with respect to the glass film 2. In addition, the width B of the glass film 2 is larger than a width C of the adhesive layer 4, and both end portions 2x of the glass film 2 in the width direction each protrude with respect to the adhesive layer 4.

A protrusion width D of each of the end portions 2x of the glass film 2 in the width direction with respect to the adhesive layer 4 is preferably from 0.1 mm to 10 mm, more preferably from 0.5 mm to 1 mm.

A protrusion width E of each of the end portions 3x of the protective film 3 in the width direction with respect to the glass film 2 is preferably from 1 mm to 100 mm, more preferably from 3 mm to 10 mm.

With such glass roll 1, both the end portions 3x of the protective film 3 in the width direction each protrude with respect to the glass film 2, and hence both the end portions 2x of the glass film 2 in the width direction are reliably protected with the protective film 3. In addition, both the end portions 2x of the glass film 2, which is smaller than that of the protective film 3, in the width direction each protrude with respect to the adhesive layer 4, and hence the adhesive layer 4 is completely hidden inside the respective end portions 2x and 3x of the glass film 2 and the protective film 3 in the width direction. Accordingly, even when the laminate film 5 is unwound from the glass roll 1 and loaded into a conveyance facility, the breakage of the glass film 2, and the contamination of a surrounding environment due to adhesion of an adhesive forming the adhesive layer 4 (e.g., adhesion of an adhesive to a roller of the conveyance facility, or the like) can be suppressed.

Figure 3:
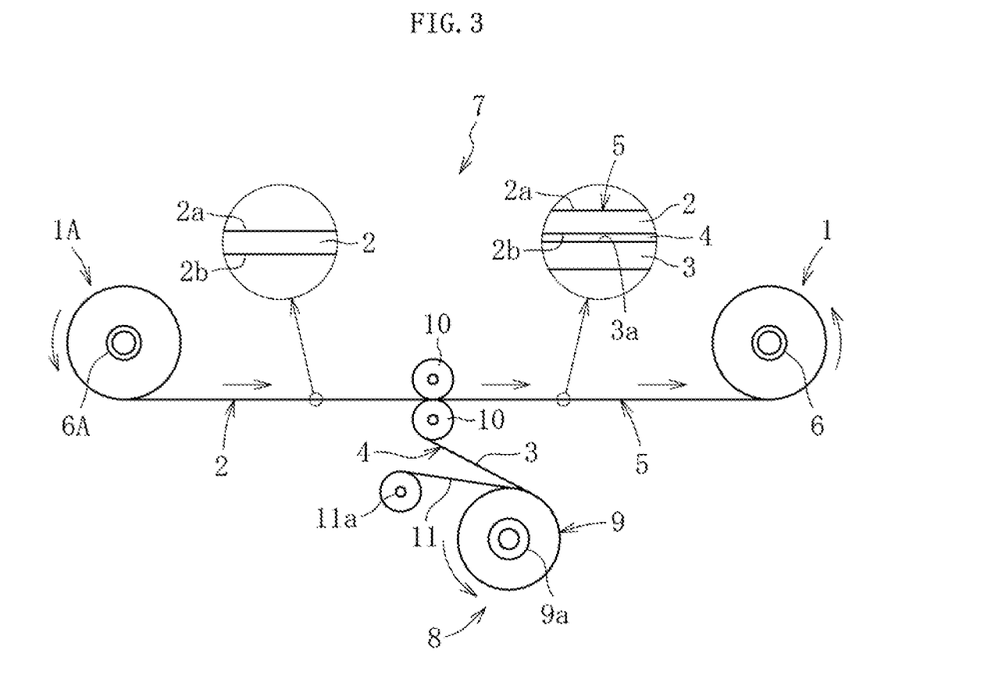
FIG. 3 is a side view for illustrating a method of manufacturing a glass roll according to the first embodiment.

FIG. 3 is a view for illustrating a manufacturing apparatus 7 for the glass roll 1. The manufacturing apparatus 7 comprises: a base material glass roll 1A formed of the glass film 2 serving as a base material; a protective film supply device 8; and the above-mentioned glass roll 1.

The base material glass roll 1A is configured by taking up the glass film 2 by a winding core 6A. The winding core 6A of the base material glass roll 1A and the winding core 6 of the glass roll 1 are arranged at a predetermined distance from each other. In this embodiment, the base material glass roll 1A and the glass roll 1 are connected to each other in a roll-to-roll manner. That is, the glass film 2 taken up by the winding core 6A is unwound from the base material glass roll 1A, and is then taken up into a roll shape by the winding core 6 according to the glass roll 1.

The protective film supply device 8 is arranged between the base material glass roll 1A and the glass roll 1. The protective film supply device 8 comprises a protective film roll 9 and guide rollers 10.

The protective film roll 9 is obtained by taking up a product, in which a separator 11 is stacked on the adhesive layer 4 formed on the one surface 3a of the strip-shaped protective film 3, into a roll shape by a winding core 9a. Under this state, as illustrated in FIG. 2, the width A of the protective film 3 is set to be larger than the width B of the glass film 2, and the width C of the adhesive layer 4 is set to be smaller than the width B of the glass film 2. The protective film roll 9 is arranged at a position below the glass film 2 laid between the base material glass roll 1A and the glass roll 1, but is not limited to this configuration. The protective film roll 9 may be arranged at a position above the glass film 2 laid between the base material glass roll 1A and the glass roll 1.

A winding core 11a for taking up the separator 11 having been peeled off from the protective film 3 is arranged in the vicinity of the protective film roll 9. The separator 11 and the winding core 11a may be omitted depending on the kind of the adhesive layer 4 and the pressure-sensitive adhesive strength thereof.

The guide rollers 10 are formed of a pair of rollers. The guide rollers 10 are configured so as to sandwich the glass film 2 and the protective film 3 therebetween.

Now, a method of manufacturing the glass roll 1 by the above-mentioned manufacturing apparatus 7 is described. This method comprises: a glass film supply step; a protective film supply step; and a take-up step.

In the glass film supply step, while the glass film 2 is unwound from the base material glass roll 1A, the glass film 2 is conveyed to a downstream side.

In the protective film supply step, the protective film 3 is unwound from the protective film roll 9 in accordance with the rotation of the winding core 9a. Simultaneously, the separator 11 is peeled off from the protective film 3. The separator 11 having been peeled off is taken up by the winding core 11a. The adhesive layer 4 formed on the one surface 3a of the protective film 3 having been unwound is brought into contact with the second surface 2b of the glass film 2 through the guide rollers 10. More specifically, the adhesive layer 4 formed on the one surface 3a of the protective film 3 is bonded to the second surface 2b of the glass film 2 by sandwiching the protective film 3 and the glass film 2 between the guide rollers 10. With this configuration, on a downstream side of the guide rollers 10, the laminate film 5 in which the glass film 2 and the protective film 3 are bonded to each other via the adhesive layer 4 is continuously formed.

In the take-up step, the laminate film 5 formed through the protective film supply step is taken up by the rotation of the winding core 6. The take-up step is finished when the glass film 2 having a predetermined length is taken up by the winding core 6, and the glass roll 1 is completed.

Second Embodiment

Figure 4:
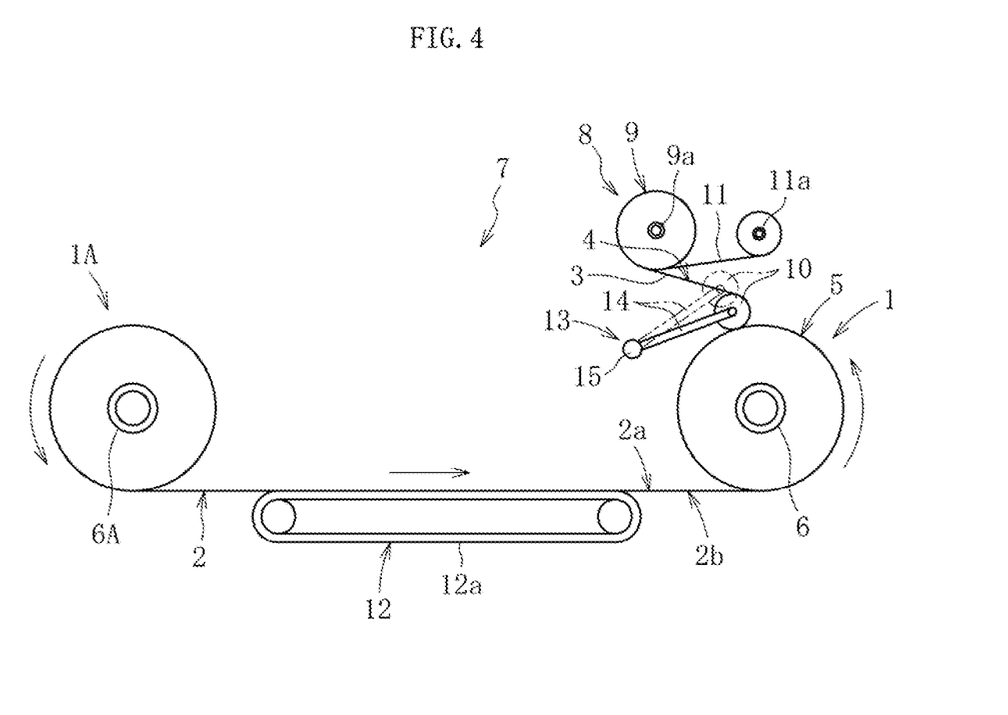
FIG. 4 is a side view for illustrating a method of manufacturing a glass roll according to a second embodiment.

FIG. 4 is a view for illustrating a second embodiment of the present invention. This embodiment differs from the first embodiment in that the manufacturing apparatus 7 for the glass roll 1 comprises a conveying device 12 and has a different configuration of the protective film supply device 8.

The conveying device 12 is arranged between the base material glass roll 1A and the glass roll 1. The conveying device 12 is formed of a conveyor belt, but is not limited thereto. The conveying device 12 guides the glass film 2 having been unwound from the base material glass roll 1A on an upstream side to the winding core 6 on a downstream side by driving an endless belt-like belt 12a. The conveying device 12 may be omitted.

The protective film supply device 8 is arranged in the vicinity of the glass roll 1. The protective film supply device 8 comprises: the protective film roll 9; the guide roller 10; and a support mechanism 13 for the guide roller 10.

The protective film roll 9 is arranged above the glass roll 1, but is not limited to this configuration. The protective film roll 9 may be arranged at a position on a downstream side of the glass roll 1 or at a position below the glass roll 1. The winding core 11a for taking up the separator 11 having been peeled off from the protective film 3 is arranged in the vicinity of the protective film roll 9. The separator 11 and the winding core 11a may be omitted depending on the kind of the adhesive layer 4 and the pressure-sensitive adhesive strength thereof.

The guide roller 10 is formed of one roller. The guide roller 10 is configured to sandwich the glass film 2 and the protective film 3 together with the winding core 6 of the glass roll 1. The guide roller 10 is arranged above the winding core 6 of the glass roll 1, but its position is not limited thereto.

The support mechanism 13 comprises: a support member 14 for supporting the guide roller 10 in a rotatable manner; and a support shaft 15 for supporting the support member 14 in a pivotable manner.

The guide roller 10 is brought into contact with an upper portion of the glass roll 1 by an appropriate pressing force caused by a moment acting about the support shaft 15 via the support member 14. When the guide roller 10 is brought into contact with the upper portion of the glass roll 1, the guide roller 10 maintains the contact with the glass roll 1 by its own weight. The guide roller 10 is supported by the support mechanism 13 so as to move while following the expansion of the outer diameter of the glass roll 1. That is, the guide roller 10 gradually moves from a position shown by the continuous line to a position shown by the long dashed double-short dashed line of FIG. 4 in accordance with the expansion of the outer diameter of the glass roll 1. A piston-cylinder mechanism of a fluid pressure system, or any other mechanism including an electric motor may be used as the support mechanism 13.

A method of manufacturing the glass roll 1 according to this embodiment comprises: a glass film supply step; a protective film supply step; and a take-up step, in the same manner as in the first embodiment.

In the glass film supply step, while the glass film 2 is unwound from the base material glass roll 1A, the glass film 2 is conveyed by the conveying device 12 to a downstream side.

In the protective film supply step, while the protective film 3 is unwound from the protective film roll 9, the separator 11 is peeled off from the protective film 3. The separator 11 having been peeled off is taken up by the winding core 11a. The guide roller 10 of the protective film supply device 8 is brought into contact with a portion (upper portion) of the glass roll 1, and the protective film 3 is brought into contact with the second surface 2b of the glass film 2 at this position. More specifically, the adhesive layer 4 formed on the one surface 3a of the protective film 3 is bonded to the second surface 2b of the glass film 2 by sandwiching the protective film 3 and the glass film 2 between the winding core 6 of the glass roll 1 and the guide roller 10. With this configuration, the laminate film 5 in which the glass film 2 and the protective film 3 are bonded to each other via the adhesive layer 4 is continuously formed.

In the take-up step, the laminate film 5 formed through the protective film supply step is taken up by the rotation of the winding core 6. The take-up step is finished when the glass film 2 having a predetermined length is taken up by the winding core 6, and the glass roll 1 is completed.

During the take-up step, the outer diameter of the glass roll 1 is expanded in accordance with the rotation of the winding core 6. The guide roller 10 of the protective film supply device 8 moves while following the expansion of the outer diameter of the glass roll 1. The support member 14 of the support mechanism 13 pivots about the support shaft 15 (in a counterclockwise manner) so as to move the guide roller 10 (with reference to the long dashed double-short dashed line of FIG. 4).

The protective film supply device 8 may be arranged in the vicinity of the base material glass roll 1A. That is, it is appropriate that the guide roller 10 of the protective film supply device 8 be brought into contact with a portion (e.g., an upper portion) of the base material glass roll 1A, and the protective film 3 be brought into contact with the second surface 2b of the glass film 2 at this position. In this case, the laminate film 5 is supplied from the base material glass roll 1A to a downstream side (e.g., the conveying device 12).

Third Embodiment

Figure 5:
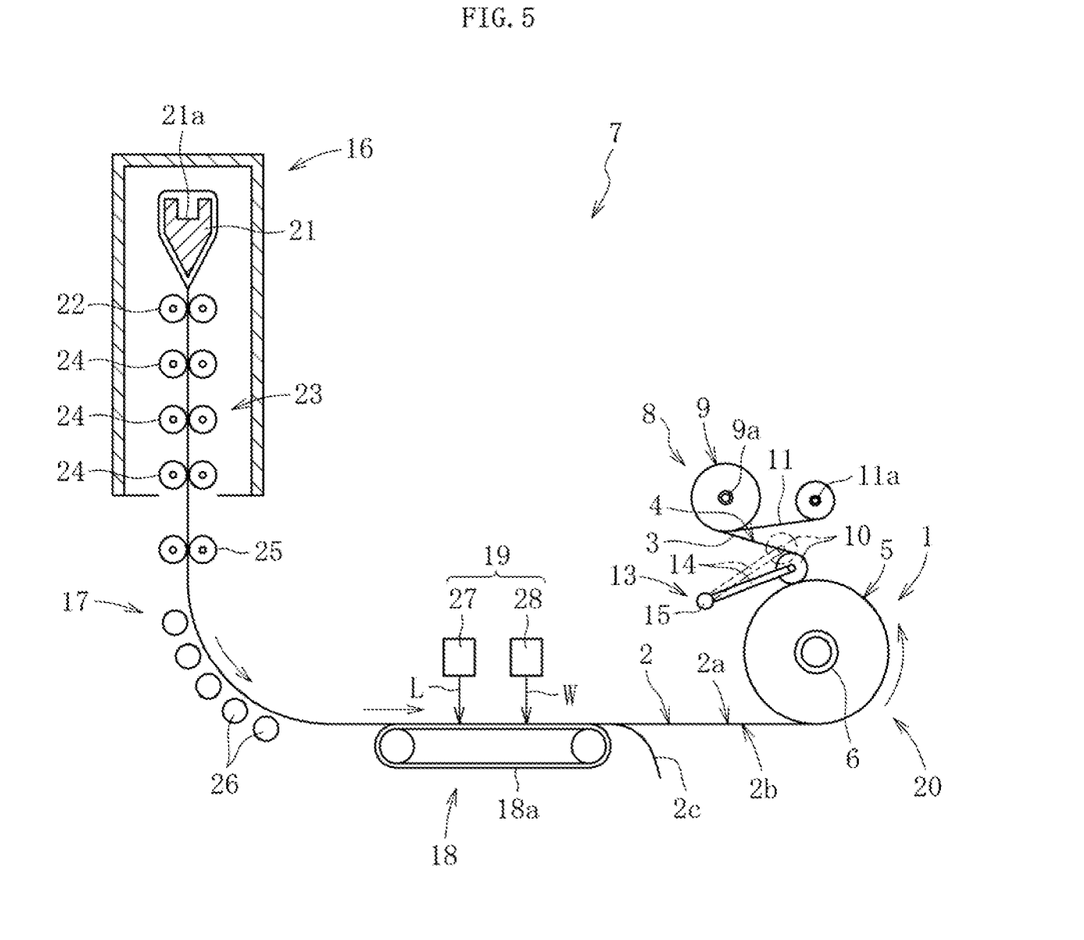
FIG. 5 is a side view for illustrating a method of manufacturing a glass roll according to a third embodiment.

FIG. 5 is a view for illustrating a third embodiment of the present invention. In the manufacturing apparatus 7 according to this embodiment, the glass roll 1 is manufactured by taking up the glass film 2 having been continuously formed by an overflow down-draw method.

The manufacturing apparatus 7 comprises: a forming portion 16 for forming the glass film 2; a direction conversion portion 17 for converting a traveling direction of the glass film 2 from a vertically downward direction to a lateral direction; a lateral conveying portion 18 for conveying the glass film 2 in the lateral direction after the direction conversion; a cutting portion 19 for cutting selvage portions 2c at end portions of the glass film 2 in the width direction; and a take-up portion 20 for taking up the glass film 2, from which the selvage portions 2c have been removed, into a roll shape to configure the glass roll 1.

The forming portion 16 comprises: a forming body 21 having a substantially wedge shape in a sectional view in which an overflow groove 21a is formed on an upper end portion thereof; edge rollers 22 arranged immediately below the forming body 21 and configured to sandwich molten glass overflowing from the forming body 21 from both front and back surface sides of the molten glass; and an annealer 23 arranged immediately below the edge rollers 22.

The forming portion 16 causes the molten glass overflowing from an upper portion of the overflow groove 21a of the forming body 21 to flow down along both side surfaces of the forming body 21 to be joined at a lower end of the forming body 21, to thereby form a molten glass in a film shape. The edge rollers 22 control shrinkage of the molten glass in a width direction to form the glass film 2 having a predetermined width. The annealer 23 is configured to perform strain removal treatment on the glass film 2. The annealer 23 comprises annealer rollers 24 arranged in a plurality of stages in a vertical direction.

Support rollers 25 sandwiching the glass film 2 from both the front and back surface sides are arranged below the annealer 23. A tension for encouraging thinning of the glass film 2 is applied between the support rollers 25 and the edge rollers 22 or between the support rollers 25 and the annealer rollers 24 at any one position.

The direction conversion portion 17 is arranged at a position below the support rollers 25. In the direction conversion portion 17, a plurality of guide rollers 26 for guiding the glass film 2 are arranged in a curved form. Those guide rollers 26 guide the glass film 2, which has been conveyed in the vertical direction, in the lateral direction.

The lateral conveying portion 18 is arranged in a forward traveling direction with respect to (on a downstream side of) the direction conversion portion 17. The lateral conveying portion 18 is formed of a conveyor belt, but is not limited to this configuration. The lateral conveying portion 18 continuously conveys the glass film 2 having passed through the direction conversion portion 17 to a downstream side by driving an endless belt-like belt 18a.

The cutting portion 19 is arranged above the lateral conveying portion 18. In this embodiment, the cutting portion 19 cuts the glass film 2 by laser cleavage, but is not limited to this configuration. Any other cutting means including laser melt-cutting may be used. The cutting portion 19 comprises a laser irradiation device 27 and a cooling device 28. The laser irradiation device 27 irradiates a predetermined site of the glass film 2 with laser light L to locally heat the site. The cooling device 28 is arranged on a downstream side of the laser irradiation device 27 in a conveying direction of the glass film 2. The cooling device 28 sprays the site of the glass film 2 having been locally heated with a refrigerant W to cool the site.

The take-up portion 20 is arranged on a downstream side of the lateral conveying portion 18 and the cutting portion 19. The take-up portion 20 takes up the glass film 2 into a roll shape by the rotation of the winding core 6. The protective film supply device 8 is arranged at a position in the vicinity of the take-up portion 20. The protective film supply device 8 has the same configuration as in the second embodiment. The protective film supply device 8 may have the same configuration as in the first embodiment. In this case, the protective film supply device 8 is arranged between the cutting portion 19 and the glass roll 1.

Now, a method of manufacturing the glass roll 1 by the manufacturing apparatus 7 having the above-mentioned configuration is described. This manufacturing method comprises: a forming step of forming the strip-shaped glass film 2 by the forming portion 16; a conveying step of conveying the glass film 2 by the direction conversion portion 17 and the lateral conveying portion 18; a cutting step of cutting the end portions (selvage portions 2c) of the glass film 2 in the width direction by the cutting portion 19; a glass film supply step of supplying the glass film 2 after the cutting step to the take-up portion 20; a protective film supply step of stacking the protective film 3 on the glass film 2; and a take-up step of taking up the glass film 2 by the take-up portion 20.

In the forming step, molten glass overflowing from an upper portion of the overflow groove 21a of the forming body 21 in the forming portion 16 is caused to flow down along both side surfaces of the forming body 21 to be joined at a lower end of the forming body 21, to thereby form a molten glass in a film shape. At this time, the shrinkage of the molten glass in a width direction is controlled with the edge rollers 22, and thus the glass film 2 having a predetermined width is formed. After that, strain removal treatment is performed on the glass film 2 with the annealer (annealing step). The glass film 2 having a predetermined thickness is formed through a tension applied by the support rollers 25.

In the conveying step, the conveying direction of the glass film 2 is converted to a lateral direction by the direction conversion portion 17, and the glass film 2 is conveyed to the take-up portion 20 on a downstream side by the lateral conveying portion 18.

In the cutting step, while the glass film 2 is fed to a downstream side by the lateral conveying portion 18, in the cutting portion 19, an initial crack is formed by a scratching member (not shown) at a front end portion of the glass film 2, and a thermal stress is then generated through expansion caused by local heating by the laser irradiation device 27 and shrinkage caused by cooling by the cooling device 28. With this configuration, the selvage portions 2c serving as non-product portions are separated from the glass film 2 serving as a product portion.

In the glass film supply step, the glass film 2 from which the selvage portions 2c have been removed through the cutting step is supplied to the take-up portion 20. The selvage portions 2c are conveyed to a downstream side of the lateral conveying portion 18, and are collected by a collecting device (not shown) on an upstream side of the take-up portion 20.

In the protective film supply step, in the same manner as in the second embodiment, the separator 11 is peeled off from the protective film 3, and the adhesive layer 4 formed on the one surface 3a of the protective film 3 is bonded to the second surface 2b of the glass film 2 by sandwiching the protective film 3 and the glass film 2 between the guide roller 10 and the winding core 6. With this configuration, the laminate film 5 in which the glass film 2 and the protective film 3 are bonded to each other via the adhesive layer 4 is continuously formed.

In the take-up step, the laminate film 5 is taken up by the winding core 6. The winding core 6 takes up the laminate film 5 so that the protective film 3 is located on an outer peripheral side of the glass film 2. The take-up step is finished when the glass film 2 having a predetermined length is taken up, and the glass roll 1 is completed.

The present invention is not limited to the configurations of the above-mentioned embodiments. In addition, the action and effect of the present invention are not limited to those described above. The present invention may be modified in various forms within the range not departing from the spirit of the present invention.

While the base material glass roll 1A formed only of the glass film 2 is taken as an example in each of the above-mentioned embodiments, the present invention is not limited to this configuration. The base material glass roll 1A may be a product in which a laminate of the glass film 2 serving as a base material and a strip-shaped buffer film formed of a resin such as PET is formed into a roll shape. In this case, the glass film 2 and the buffer film unwound from the base material glass roll 1A are separated from each other in the glass film supply step. The buffer film having been separated is taken up by a separately prepared winding core in the vicinity of the base material glass roll 1A.

While the configuration in which the protective film 3 is bonded to the second surface 2b of the glass film 2, and the laminate film 5 is then directly taken up by the winding core 6 is taken as an example in each of the above-mentioned embodiments, the present invention is not limited to this configuration. It is appropriate that the protective film 3 be bonded to the second surface 2b of the glass film 2, a strip-shaped buffer film formed of a resin such as PET be then stacked (in a non-bonded state) on a first surface 2a side of the glass film 2, and the laminate film 5 be taken up by the winding core 6. In this case, the surface accuracy of the first surface 2a (guaranteed surface) can be ensured more effectively.

A leader (e.g., a strip-shaped resin film) for connecting the glass film 2 and each of the winding cores 6A and 6 may be connected to each of a beginning end portion and a terminating end portion of the strip-shaped glass film 2.

REFERENCE SIGNS LIST 1 glass roll
2 glass film
3 protective film
4 adhesive layer
5 laminate film
6 winding core
7 manufacturing apparatus
8 protective film supply device
9 protective film roll
10 guide roller
11 separator
12 conveying device
13 support mechanism
14 support member
17 direction conversion portion
18 lateral conveying portion
19 cutting portion
20 take-up portion
21 forming body
22 edge roller
23 annealer
24 annealer roller
25 support roller
26 guide roller
27 laser irradiation device
28 cooling device
A width of protective film
B width of glass film
C width of adhesive layer
D protrusion width of glass film with respect to adhesive layer
E protrusion width of protective film with respect to glass film

The invention claimed is:

1. A glass roll, comprising a laminate film taken up into a roll shape, the laminate film comprising a glass film, a protective film, and an adhesive layer, which is arranged between the glass film and the protective film, and is configured to bond the glass film to the protective film,
wherein a width of the protective film is larger than a width of the glass film, and both end portions of the protective film in a width direction each protrude with respect to the glass film, and
wherein the width of the glass film is larger than a width of the adhesive layer, and both end portions of the glass film in the width direction each protrude with respect to the adhesive layer.

2. The glass roll according to claim 1, wherein a protrusion width of each of the end portions of the glass film in the width direction with respect to the adhesive layer is from 0.1 mm to 10 mm.

3. The glass roll according to claim 1, wherein a protrusion width of each of the end portions of the protective film in the width direction with respect to the glass film is from 1 mm to 100 mm.

4. The glass roll according to claim 1, wherein the adhesive layer is a light pressure-sensitive adhesive layer formed on one surface of the protective film.

5. The glass roll according to claim 1, wherein the adhesive layer has a thickness of 100 μm or less.

6. The glass roll according to claim 2, wherein a protrusion width of each of the end portions of the protective film in the width direction with respect to the glass film is from 1 mm to 100 mm.

7. The glass roll according to claim 2, wherein the adhesive layer is a light pressure-sensitive adhesive layer formed on one surface of the protective film.

8. The glass roll according to claim 3, wherein the adhesive layer is a light pressure-sensitive adhesive layer formed on one surface of the protective film.

9. The glass roll according to claim 6, wherein the adhesive layer is a light pressure-sensitive adhesive layer formed on one surface of the protective film.

10. The glass roll according to claim 2, wherein the adhesive layer has a thickness of 100 μm or less.

11. The glass roll according to claim 3, wherein the adhesive layer has a thickness of 100 μm or less.

12. The glass roll according to claim 6, wherein the adhesive layer has a thickness of 100 μm or less.

13. The glass roll according to claim 4, wherein the adhesive layer has a thickness of 100 μm or less.

14. The glass roll according to claim 7, wherein the adhesive layer has a thickness of 100 μm or less.

15. The glass roll according to claim 8, wherein the adhesive layer has a thickness of 100 μm or less.

16. The glass roll according to claim 9, wherein the adhesive layer has a thickness of 100 μm or less.

* * * * *